(12) United States Patent  
McIntosh et al.

(10) Patent No.: US 9,336,660 B2  
(45) Date of Patent: May 10, 2016

(54) OVERHEAD HAZARD WARNING SYSTEMS

(76) Inventors: David McIntosh, North Vancouver (CA); Steve M. Smith, Vanvouer (CA)

( * ) Notice: Subject to any disclaimer, the term of this patent is extended or adjusted under 35 U.S.C. 154(b) by 529 days.

(21) Appl. No.: 13/634,198

(22) PCT Filed: Mar. 11, 2011

(86) PCT No.: PCT/CA2011/000255
§ 371 (c)(1),
(2), (4) Date: Nov. 27, 2012

(87) PCT Pub. No.: WO2011/109897
PCT Pub. Date: Sep. 15, 2011

(65) Prior Publication Data
US 2013/0187785 A1    Jul. 25, 2013

Related U.S. Application Data

(60) Provisional application No. 61/313,082, filed on Mar. 11, 2010.

(51) Int. Cl.
| | | |
|---|---|---|
| G08B 21/00 | (2006.01) | |
| G08B 5/00 | (2006.01) | |
| B66F 17/00 | (2006.01) | |
| F16P 3/14 | (2006.01) | |

(52) U.S. Cl.
CPC .................. *G08B 5/00* (2013.01); *B66F 17/006* (2013.01); *F16P 3/14* (2013.01); *F16P 3/144* (2013.01)

(58) Field of Classification Search
CPC ............. G08B 5/00; B66F 17/006; F16P 3/14
USPC ................. 340/815.4, 691.6, 541, 555, 572.1
See application file for complete search history.

(56) References Cited

U.S. PATENT DOCUMENTS

| | | | | |
|---|---|---|---|---|
| 4,712,167 | A | * | 12/1987 | Gordin et al. .................. 362/233 |
| 5,207,747 | A | * | 5/1993 | Gordin et al. .................. 362/233 |
| 5,572,202 | A | * | 11/1996 | Regel et al. .................... 340/917 |
| 5,734,339 | A | * | 3/1998 | Ogle ............................. 340/944 |
| 6,208,260 | B1 | | 3/2001 | West et al. |
| 2005/0259150 | A1 | | 11/2005 | Furumi et al. |
| 2008/0048880 | A1 | * | 2/2008 | Strickland et al. ......... 340/815.4 |
| 2008/0055105 | A1 | * | 3/2008 | Blum et al. ................ 340/815.4 |

FOREIGN PATENT DOCUMENTS

EP          0367034  A2      5/1990

* cited by examiner

*Primary Examiner* — Daryl Pope
(74) *Attorney, Agent, or Firm* — Oyen Wiggs Green & Mutala LLP

(57) ABSTRACT

An overhead hazard warning system for an elevated work platform comprises a projector coupled to the work platform and configured to project a pattern of light downwardly to produce a visual indication on a surface below the work platform, a range finder configured to produce an elevation signal representative of a height of the projector relative to the surface below the work platform, and a controller connected to receive the elevation signal and configured to control the projector based on the elevation signal.

49 Claims, 5 Drawing Sheets

OVERHEAD HAZARD WARNING SYSTEMS

REFERENCE TO RELATED APPLICATION

This application claims priority from U.S. Provisional Patent Application Ser. No. 61/313,082, filed 11 Mar. 2010 and entitled "OVERHEAD HAZARD WARNING SYSTEMS." For the purposes of the United States of America, the benefit under 35 U.S.C. §119(e) of this application is hereby claimed, and this application is hereby incorporated herein by reference.

TECHNICAL FIELD

The invention relates generally to overhead hazard warning systems. Particular embodiments provide overhead hazard warning systems for use with work platforms supported by cranes, lifts, hoists, booms or other devices.

BACKGROUND

In many industries, such as, for example, construction, manufacturing, warehousing and film production industries, there may be individuals working near or below elevated work platforms supported by cranes, lifts, booms, hoists, or other devices. These individuals may sustain injuries if they are they are hit by a tool or other object that is dropped from the elevated work platform. This can be particularly dangerous in settings where individuals below are not wearing hard hats.

The inventors have determined a need for systems that alert workers when they are in the immediate vicinity of, or underneath elevated work platforms.

SUMMARY

The following embodiments and aspects thereof are described and illustrated in conjunction with systems, tools and methods which are meant to be exemplary and illustrative, not limiting in scope.

One aspect provides an overhead hazard warning system for an elevated work platform comprising a projector coupled to the work platform and configured to project a pattern of light downwardly to produce a visual indication on a surface below the work platform, a range finder configured to produce an elevation signal representative of a height of the projector relative to the surface below the work platform, and a controller connected to receive the elevation signal and configured to control the projector based on the elevation signal.

Another aspect provides a method for warning of overhead hazards presented by an elevated work platform comprising coupling a projector to the work platform, determining a height of the projector relative to a surface below the work platform, and controlling the projector based on the determined height to project a pattern of light downwardly to produce a visual indication on the surface below the work platform.

Another aspect provides apparatus for warning of overhead hazards presented by an elevated work platform comprising a projector coupled to the work platform and configured to project a pattern of light downwardly to produce a visual indication on a surface below the work platform, and a controller connected to receive projector position information and configured to control the projector based on the projector position information.

In addition to the exemplary aspects and embodiments described above, further aspects and embodiments will become apparent by reference to the drawings and by study of the following detailed descriptions.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well-known elements have not been shown or described in detail to avoid unnecessarily obscuring the invention. Accordingly, the specification and drawings are to be regarded in an illustrative, rather than a restrictive, sense.

Some embodiments of the invention in the following description relate to overhead warning systems to be used with elevated work platforms. The following paragraphs describe example overhead warning systems used with an elevated work platform supported by a boom lift. The scope of the invention, however, is not limited to these examples. For example, in other embodiments overhead warning systems may be used with elevated work platforms or other overhead equipment supported by other lifting devices such as cranes, hoists, or other devices.

Figure 1:
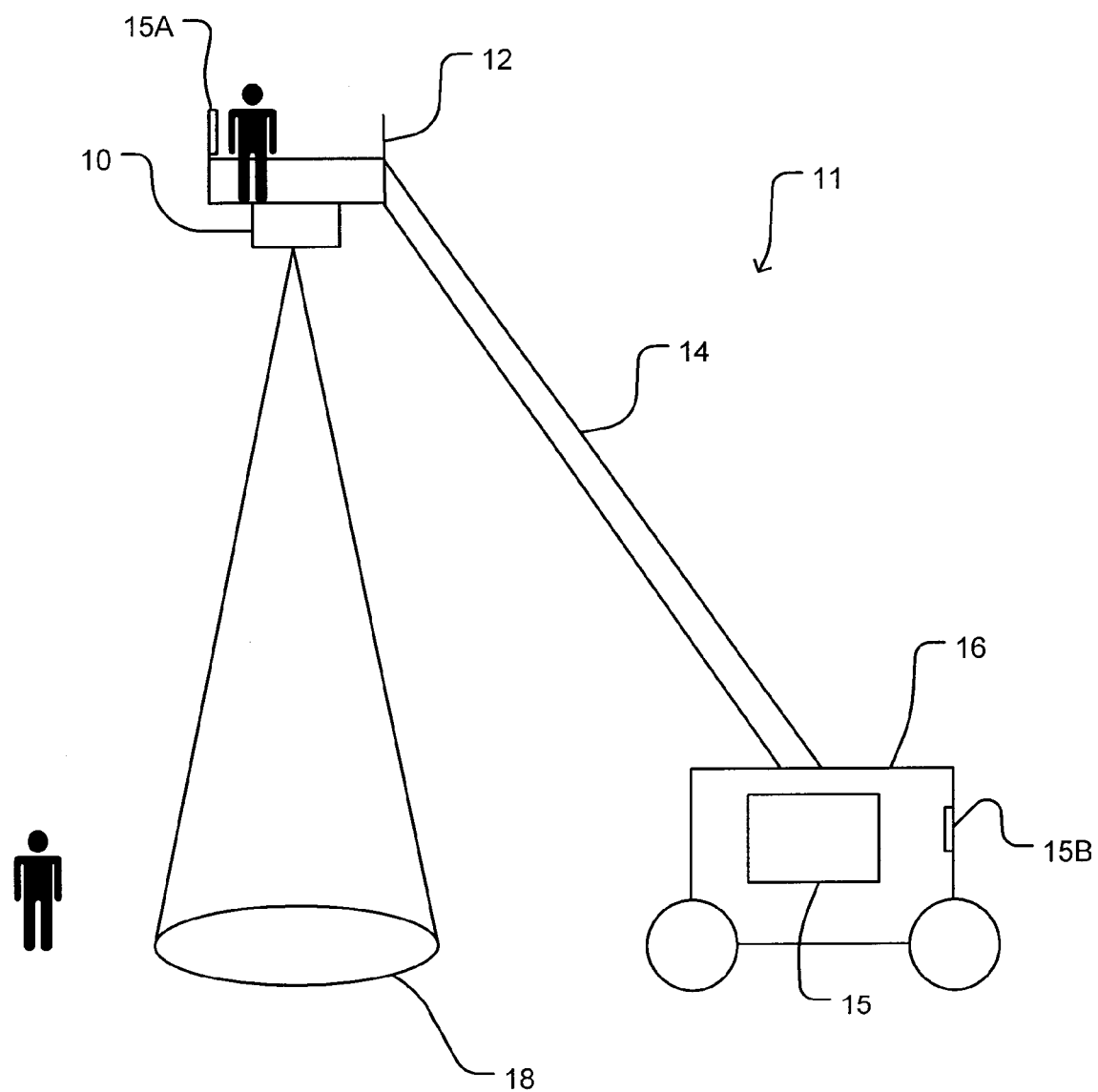
FIG. 1 shows an overhead hazard warning system coupled to an overhead work platform supported by a boom lift according to one embodiment of the invention.

FIG. 1 shows an overhead warning system 10 according to one embodiment for use with a boom lift 11. Boom lift 11 comprises an elevated work platform 12 supported by an adjustable arm 14, which is mounted on a movable vehicle 16. Arm 14 may comprise telescoping elements, articulated elements, or some combination thereof. Overhead warning system 10 is coupled to work platform 12. Work platform 12 may comprise, for example, a "man basket" or other structure for supporting one or more workers. The length, configuration, and/or angle of arm 14 is adjustable so that work platform 12 can be moved to a desired height and/or location at a work site. Overhead warning system 10 produces a visual indication 18 on the ground to alert people in the area of the location of platform 12. Visual indication 18 may be larger than a projection of platform 12 on the ground in some embodiments.

In the embodiment of FIG. 1, visual indication 18 comprises a circular perimeter warning line. In other embodiments, visual indication 18 may have a perimeter warning line of different shapes. In some embodiments, visual indication 18 may have a shape selected based on the shape of work platform 12. For example, if work platform 12 had an elongated shape, visual indication 18 may have a generally corresponding shape. Visual indication 18 may also comprise other elements, such as, for example words such as "DANGER", "CAUTION", "KEEP CLEAR", or the like, within the perimeter warning line.

In some embodiments, overhead warning system 10 is removably or permanently attached to elevated work platform 12. In other embodiments, overhead warning system 10 may be attached to the supporting structure for work platform 12. For example, overhead warning system 10 could be attached to arm 14, or to a pivoting connection between work platform 12 and arm 14.

In some embodiments, overhead warning system 10 is coupled to a bottom portion of elevated work platform 12. For example, in embodiments wherein elevated work platform 12 comprises has a frame which supports a floor at a position above the bottom of the frame, overhead warning system 10 may be bolted or otherwise attached underneath a floor of work platform 12, such that overhead warning system 10 is within the volume defined by the frame of work platform 12. In other embodiments, overhead warning system 10 may be coupled to one of the sides of work platform 12, or at another convenient location, depending on the particular configuration of work platform 12.

Figure 1A:
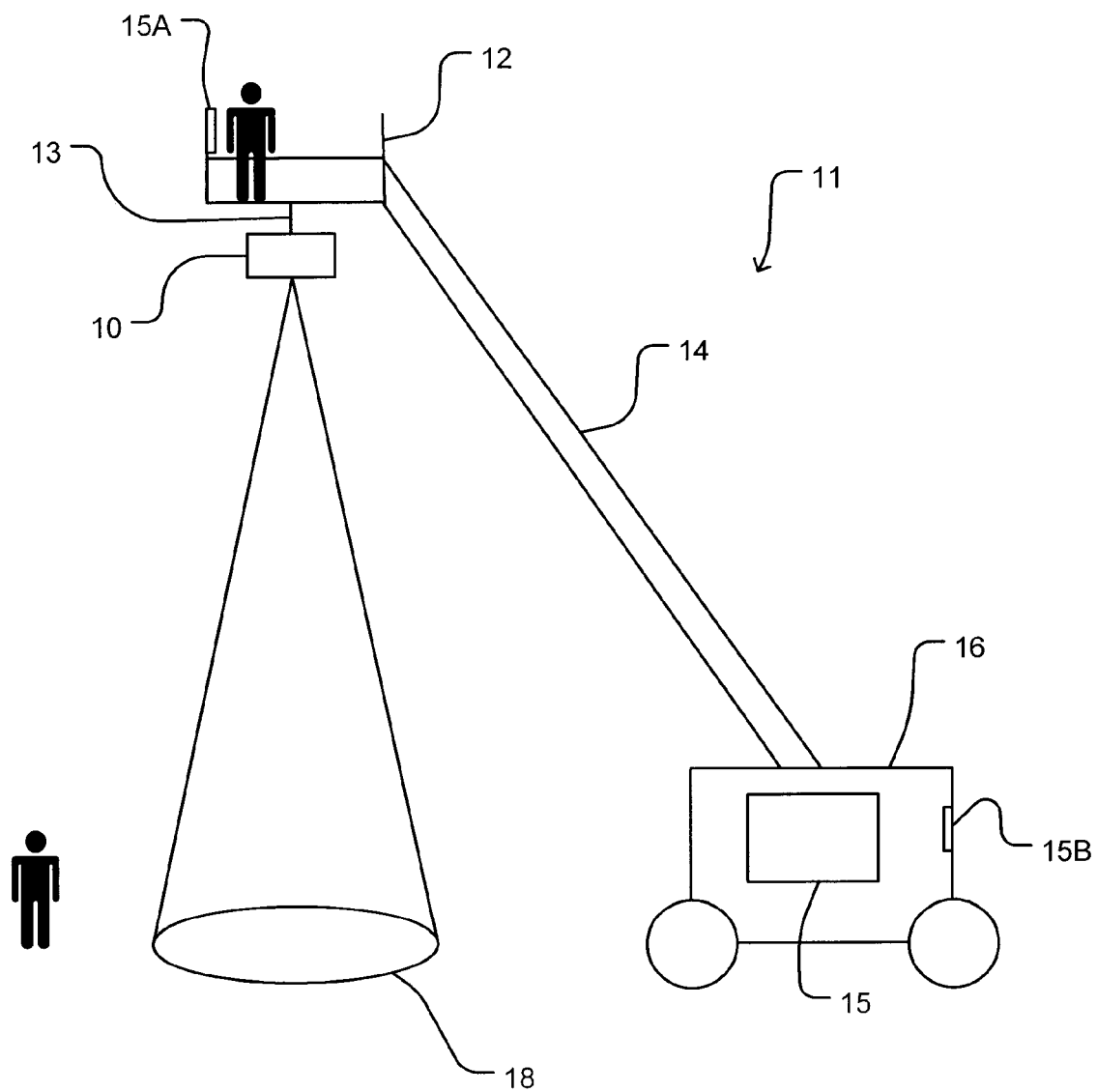
FIG. 1A shows an overhead hazard warning system coupled to an overhead work platform supported by a boom lift according to another embodiment of the invention.

In some embodiments, overhead warning system 10 comprises a portable unit which may be removably coupled to an overhead work platform or the supporting structure therefor. Similarly, in some embodiments, a portable overhead warning system may be removably coupled to other overhead equipment such as, for example, a cable of a crane, a hook of a crane, a boom of a crane, a window washing platform, scaffolding, or the like. In some such embodiments, the overhead warning system may be hung from any suitable attachment point on the overhead equipment by a cable 13 or the like (see FIG. 1A), such that gravity tends to urge the overhead warning system to a constant orientation with respect to the ground.

Figure 2A:
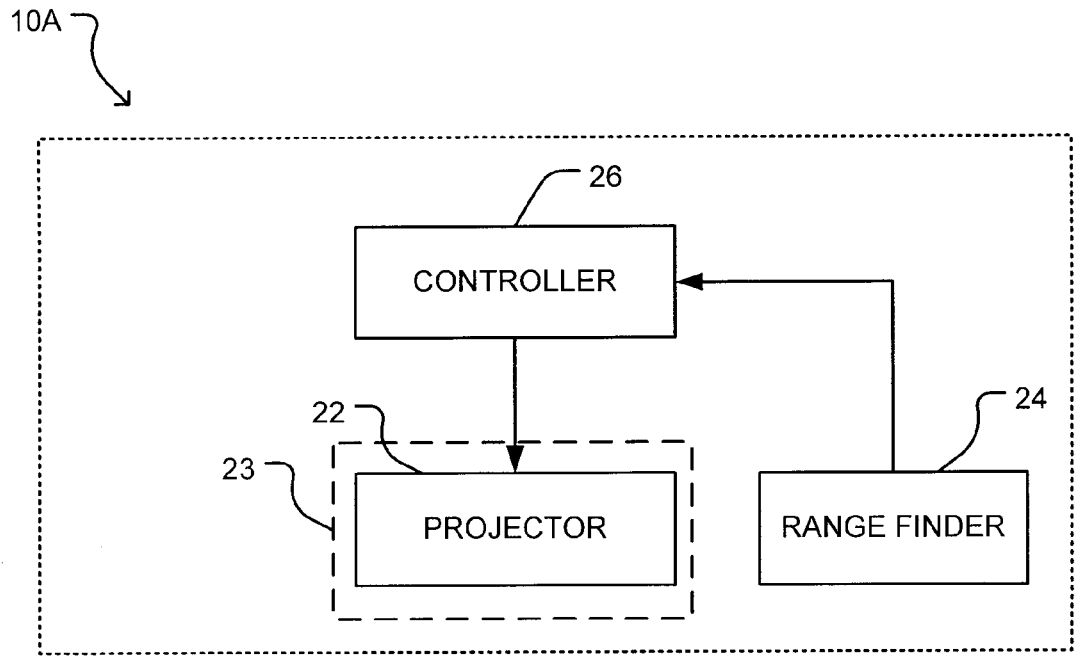
FIG. 2A is a block diagram showing components of an overhead hazard warning system according to one embodiment of the invention.

FIG. 2A shows an example configuration of overheard warning system 10A according to one embodiment. Overhead warning system 10A comprises a projector 22 having one or more light sources and an optical system which is configured to produce a desired pattern of light. Projector 22 is positioned to direct the pattern of light onto a surface below work platform 12 in order to produce visual indication 18.

Overhead warning system 10A also comprises a range finder 24 and a controller 26. Range finder 24 is configured to measure the height of overhead warning system 10A relative to the ground, and provide a signal representative of this height to controller 26. Controller 26 uses the signal from range finder 24 to control projector 22 to vary the angular spread of the pattern of light based on the height of overhead warning system 10A. Controller 26 may comprise any suitable device having appropriately configured processing hardware. Controller 26 may also comprise memory storing computer readable instructions for execution by processing hardware. Such processing hardware may include one or more programmable processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like.

In some embodiments, controller 26 uses signals from range finder 24 to control projector 22 to adjust the angular spread of the pattern of light from projector 22 so that the size of visual indication 18 remains consistent regardless of the height of projector 22. In other embodiments, controller 26 may cause projector 22 to vary the size of visual indication 18 as a function of the height of projector 22, such that a larger visual indication 18 is produced when work platform 12 has a higher elevation. In some embodiments, controller 26 may be configured to cause projector 22 to increase the size of visual indication 18 as the height of projector 22 increases at a slower rate than the size of visual indication 18 would increase if the angular spread of the pattern of light from projector 22 were not adjusted.

Projector 22 may optionally be coupled to a leveling mechanism 23 to ensure that projector 22 is maintained at a constant orientation with respect to the ground. For example, in some embodiments projector 22 is mounted on one or more gimbals (not shown) operated under the control of controller 26 in response to a signal from a tilt sensor (not shown in FIG. 2A, see FIG. 4) such as an accelerometer, an inclinometer, a gyroscope or other orientation sensor. In other embodiments, information about the orientation of projector 22 is determined by a tilt sensor such as an accelerometer, an inclinometer, a gyroscope or other orientation sensor and provided to controller 26, and controller 26 in turn adjusts the angle at which visual indication 18 is projected accordingly to maintain visual indication 18 in a desired position below work platform 12.

In some embodiments, controller 26 is also coupled to a control system 15 of boom lift 11 (see FIG. 1) in order to control the operation of overhead warning system 10A based on the mode of operation of boom lift 11. For example, controller 26 may be configured to turn on projector 22 to produce visual indication 18 whenever a worker is in work platform 12, or whenever work platform 12 is above some predetermined threshold height. Similarly, controller 26 may be configured to turn off projector 22 whenever work platform 12 is unoccupied or whenever work platform 12 is below the threshold height. In the FIG. 1 embodiment, boom lift 11 comprises a control system 15 that has user interfaces 15A and 15B at work platform 12 and vehicle 16, respectively. Controller 26 may be configured to turn on projector 22 whenever user interface 15A at work platform 12 is active. Controller 26 may be configured to turn off projector 22 whenever user interface 15B at vehicle 16 is active.

Figure 2B:
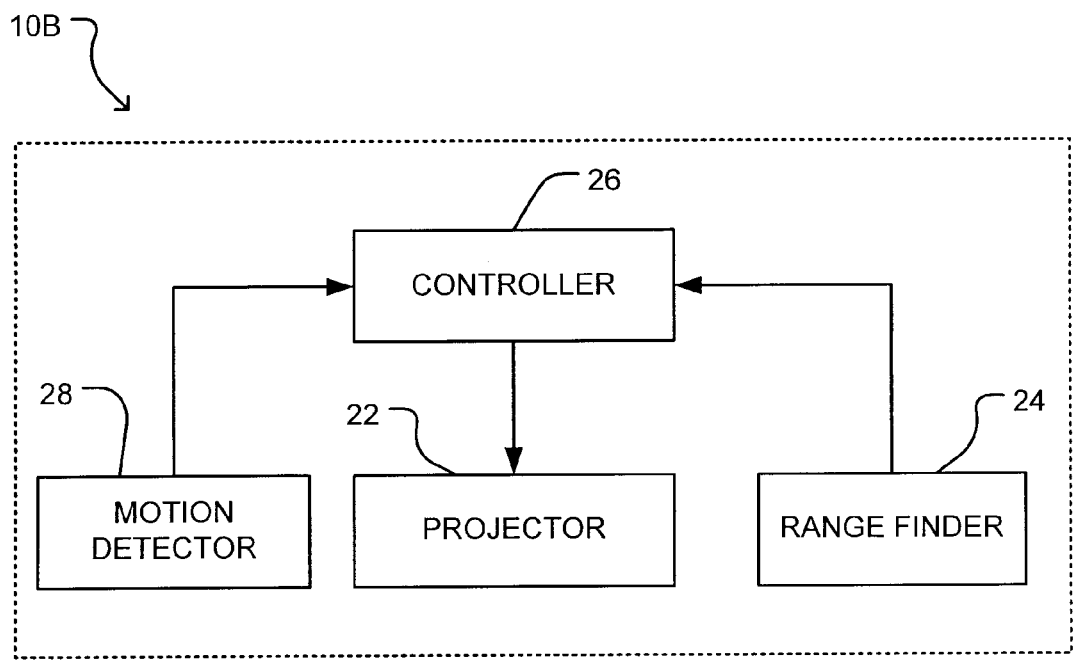
FIG. 2B is a block diagram showing components of an overhead hazard warning system according to another embodiment of the invention.
Figure 3:
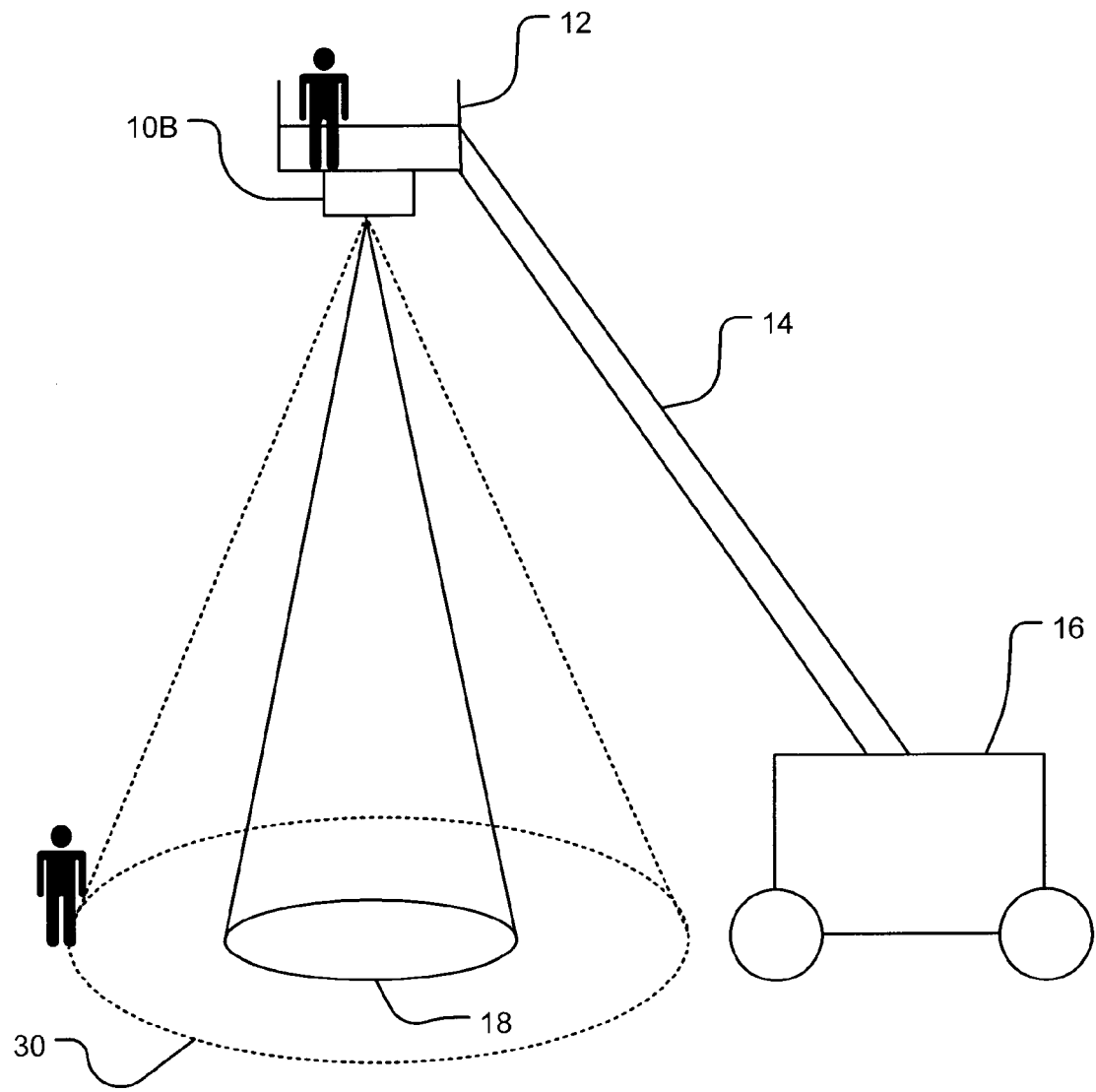
FIG. 3 shows the overhead hazard warning system of FIG. 2B coupled to an overhead work platform supported by a boom lift.

FIG. 2B shows an example configuration of overheard warning system 10B according to one embodiment. Overhead warning system 10B is the same as system 10A of FIG. 2A, with the addition of a motion detector 28. Motion detector 28 is configured to detect motion within an area 30 (see FIG. 3) centered beneath work platform 12 and provide a signal indicative of such movement to controller 26. Area 30 may be substantially larger in size than visual indication 18. For example, in some embodiments, area 30 is a circle having a diameter of about 30 feet, and visual indication 18 has a diameter of about 15 feet. In some embodiments, controller 26 is configured to turn on projector 22 only when motion is detected within area 30, in order to conserve power when nobody is in the area underneath work platform 12. In some embodiments, motion detector 28 is also configured to produce another signal indicative of motion within the perimeter of visual indication 18, and controller 26 is configured to turn off projector 22 in response to such a signal in order to avoid potential eye injury from laser light projected by projector 22.

In some embodiments, projector 22 comprises a laser light source and one or more controllable mirrors for selectively directing light from the laser in a desired direction. By rapidly moving the mirrors, nearly any desired pattern of light may be produced by projector 22. In some embodiments, projector 22 comprises, for example, a laser such as a 300 milliwatt laser which directs a laser beam at an X-Y scanner.

Figure 4:
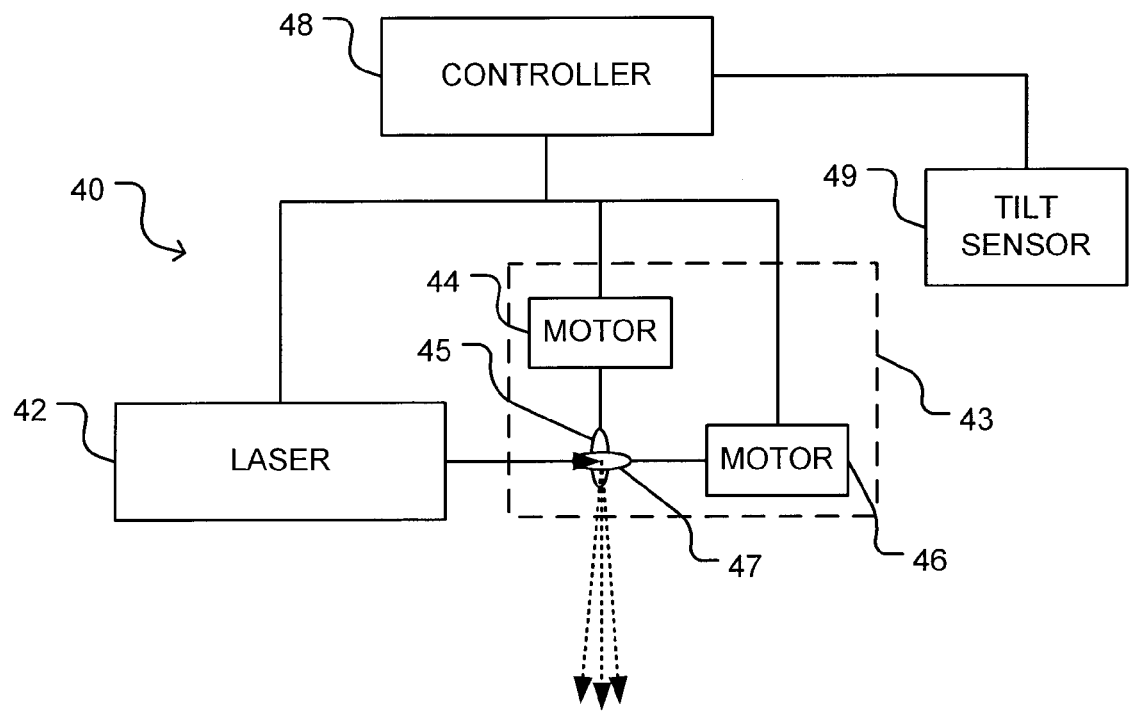
FIG. 4 shows a projector of an overhead warning system according to one embodiment of the invention.

FIG. 4 shows an example projector 40 comprising a laser 42 positioned to direct a beam of light at a scanner 43. Scanner 43 comprises motors 44 and 46, which are configured to controllably rotate reflectors 45 and 47, respectively. A controller 48 is coupled to turn laser 42 on and off and to control the operation of motors 44 and 46 to rapidly move reflectors 45 and 47 to redirect the beam from laser 42 to produce the desired visual indication. Controller 48 may comprise any suitable device having appropriately configured processing hardware. Controller 48 may also comprise memory storing computer readable instructions for execution by processing hardware. Such processing hardware may include one or more programmable processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like.

In the FIG. 4 embodiment, a tilt sensor 49 is also provided to provide orientation information to controller 48, such that controller 48 may adjust the angle at which the visual indication is projected from projector 40 to compensate for any tilting of projector 40. Tilt sensor 49 may comprise, for example, an accelerometer, an inclinometer, a gyroscope or other orientation sensor. As one skilled in the art will appreciate, controller 48 of the FIG. 4 embodiment may be a separate unit from controller 26 as discussed above with respect to FIGS. 2A and 2B, or may be combined with controller 26 into a single unit. The FIG. 4 embodiment may also optionally include a range finder and a motion detector, as discussed above.

Figure 5:
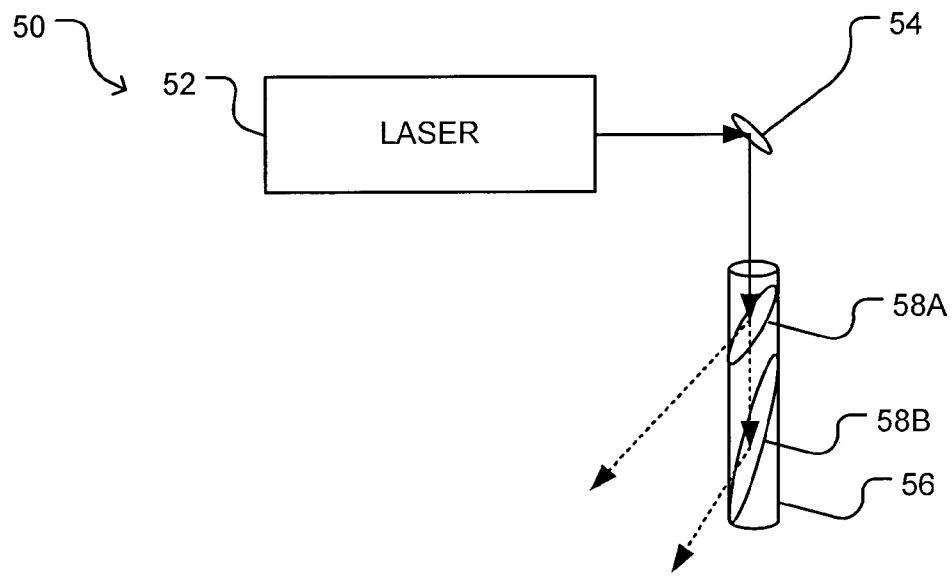
FIG. 5 shows a projector of an overhead warning system according to another embodiment of the invention.

FIG. 5 shows an example projector 50 according to another embodiment. Projector 50 comprises a laser 52 which directs a beam of light at a fixed mirror 54, which in turn directs the beam of light into a spinning tube 56. Tube 56 is coupled to be spun by a motor (not shown), and has one or more mirrors 58 positioned along the interior thereof. In the illustrated embodiment, tube 56 has a partially reflective (e.g. 50%) mirror 58A oriented at a first angle, and a fully reflective mirror 58B oriented at a second angle. By spinning tube 56 and mirrors 58, projector 50 may be used to create a visual indication comprising two concentric circles. As one skilled in the art will appreciate, the operation of laser 52 and the motor which spins tube 56 may be controlled by one or more suitable controllers (not shown).

In other embodiments, projector 22 may comprise one or more lasers oriented at an acute angle with respect to the vertical direction, and a motor for spinning the lasers about a vertical axis in order to produce a circular visual indication. In such embodiments, the angles of the lasers may be controllable to adjust the size of the visual indication, as discussed above. In other embodiments, projector 22 may comprise one or more non-laser light sources.

Where a component (e.g. an assembly, device, etc.) is referred to above, unless otherwise indicated, reference to that component (including reference to a means) should be interpreted as including as equivalents of that component any component which performs the same function as the described component, including components which are not structurally equivalent to the disclosed structures which perform the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An overhead hazard warning system for an elevated work platform comprising:
   a projector coupled to the work platform and configured to project a pattern of light downwardly to produce a visual indication on a surface below the work platform;
   a range finder configured to produce an elevation signal representative of a height of the projector relative to the surface below the work platform; and,
   a controller connected to receive the elevation signal and configured to control the projector based on the elevation signal and the controller is configured to vary an angular spread of the pattern of light projected by the projector based on the height of the projector.

2. An overhead hazard warning system according to claim 1 wherein the visual indication comprises a perimeter warning line.

3. An overhead hazard warning system according to claim 2 wherein the perimeter warning line is generally circular.

4. An overhead hazard warning system according to claim 2 wherein the perimeter warning line has a shape which is selected based on a shape of the work platform.

5. An overhead hazard warning system according to claim 2 wherein the visual indication comprises words within the perimeter warning line.

6. An overhead hazard warning system according to claim 1 wherein the controller is configured to maintain the size of the visual indication constant regardless of the height of the projector.

7. An overhead hazard warning system according to claim 1 wherein the controller is configured to increase the size of the visual indication as the height of the projector increases.

8. An overhead hazard warning system according to claim 1 wherein the projector comprises a laser and a scanner, the laser positioned to direct a beam of light at the scanner, the scanner comprising one or more reflectors moveable under control of the controller to produce the visual indication.

9. An overhead hazard warning system according to claim 8 wherein the scanner comprises two motors and two reflectors, each motor configured to controllably rotate one of the reflectors.

10. An overhead hazard warning system for an elevated work platform comprising:
    a projector coupled to the work platform and configured to project a pattern of light downwardly to produce a visual indication on a surface below the work platform; and
    a motion detector configured to produce a motion signal indicative of motion within an area centered beneath the work platform, and wherein the system comprises a controller configured to control the projector based on the motion signal.

11. An overhead hazard warning system according to claim 10 wherein the area is larger than the visual indication, and wherein the controller is configured to turn on the projector when motion is detected within the area.

12. An overhead hazard warning system according to claim 10 wherein the controller is configured to turn off the projector when motion is detected within a perimeter of the visual indication.

13. An overhead hazard warning system according to claim 10 wherein the projector comprises a laser and a scanner, the laser positioned to direct a beam of light at the scanner, the scanner comprising one or more reflectors moveable under control of the controller to produce the visual indication.

14. An overhead hazard warning system according to claim 13 wherein the scanner comprises two motors and two reflectors, each motor configured to controllably rotate one of the reflectors.

15. An overhead hazard warning system for an elevated work platform comprising:
 a projector coupled to the work platform and configured to project a pattern of light downwardly to produce a visual indication on a surface below the work platform; and
 a controller and a tilt sensor configured to produce a tilt signal indicative of an orientation of the projector and provide the tilt signal to the controller.

16. An overhead hazard warning system according to claim 15 wherein the tilt sensor comprises one of an accelerometer, an inclinometer and a gyroscope.

17. An overhead hazard warning system according to claim 15 wherein the controller is configured to adjust a projection angle at which the pattern of light is projected from the projector based on the tilt signal.

18. An overhead hazard warning system according to claim 15 wherein the projector is mounted on a levelling mechanism configured to adjust the orientation of the projector, and wherein the controller is coupled to the levelling mechanism and configured to maintain the orientation of the projector substantially constant based on the tilt signal.

19. An overhead hazard warning system according to claim 18 wherein the levelling mechanism comprises one or more gimbals.

20. An overhead hazard warning system according to claim 15 wherein the projector comprises a laser and a scanner, the laser positioned to direct a beam of light at the scanner, the scanner comprising one or more reflectors moveable under control of the controller to produce the visual indication.

21. An overhead hazard warning system according to claim 20 wherein the scanner comprises two motors and two reflectors, each motor configured to controllably rotate one of the reflectors.

22. An overhead hazard warning system for an elevated work platform comprising a projector coupled to the work platform and configured to project a pattern of light downwardly to produce a visual indication on a surface below the work platform, wherein the projector is suspended by a cable from the work platform such that gravity tends to urge the projector to a constant orientation with respect to the ground.

23. An overhead hazard warning system for an elevated work platform comprising a projector coupled to the work platform and configured to project a pattern of light downwardly to produce a visual indication on a surface below the work platform, wherein the work platform comprises a frame which supports a floor at a position above a bottom of the frame, and wherein the overhead hazard warning system is attached underneath the floor and within a volume defined by the frame.

24. An overhead hazard warning system according to claim 23 wherein the work platform further comprises part of a boom lift comprising an adjustable arm mounted on a moveable vehicle, wherein the work platform is supported by the adjustable arm.

25. An overhead hazard warning system according to claim 24 wherein the boom lift comprises a control system and wherein the system comprises a controller coupled to the control system and configured to control the operation of the projector based on a mode of operation of the boom lift.

26. An overhead hazard warning system according to claim 25 wherein the controller is configured to turn on the projector when the work platform is occupied or when the work platform is above a threshold height, and turn off the projector when the work platform is unoccupied or when the work platform is below the threshold height.

27. An overhead hazard warning system according to claim 25 wherein the boom lift control system comprises user interfaces at the work platform and the moveable vehicle, wherein the controller is configured to turn on the projector when the user interface at the work platform is active.

28. An overhead hazard warning system according to claim 27 wherein the controller is configured to turn off the projector when the user interface at the moveable vehicle is active.

29. An overhead hazard warning system for an elevated work platform comprising a projector coupled to the work platform and configured to project a pattern of light downwardly to produce a visual indication on a surface below the work platform, wherein the projector comprises a laser which directs a beam of light into a tube coupled to be spun by a motor, the tube comprising one or more angled mirrors positioned in an interior thereof.

30. An overhead hazard warning system for an elevated work platform comprising a projector coupled to the work platform and configured to project a pattern of light downwardly to produce a visual indication on a surface below the work platform, wherein the projector comprises one or more lasers oriented at an acute angle with respect to the vertical direction, and a motor for spinning the lasers about a vertical axis in order to produce a circular visual indication.

31. A method for warning of overhead hazards presented by an elevated work platform, the method comprising:
 providing a projector coupled to the work platform;
 operating the projector to project a pattern of light downwardly to produce a visual indication on a surface below the work platform; and
 detecting motion within an area centered beneath the work platform and controlling the projector based on the detected motion.

32. A method according to claim 31 wherein the visual indication comprises a perimeter warning line.

33. A method according to claim 32 wherein the visual indication comprises words within the perimeter warning line.

34. A method according to claim 31 wherein the method further comprises determining a height of the projector relative to the surface below the work platform and controlling the projector based on the determined height wherein controlling the projector comprises varying an angular spread of the pattern of light projected by the projector based on the height of the projector.

35. A method according to claim 34 comprising maintaining the size of the visual indication constant regardless of the height of the projector.

36. A method according to claim 34 comprising increasing the size of the visual indication as the height of the projector increases.

37. A method according to claim 31 wherein the area is larger than the visual indication, the method comprising turning on the projector when motion is detected within the area.

38. A method according to claim 31 comprising turning off the projector when motion is detected within a perimeter of the visual indication.

39. A method according to claim 31 wherein the work platform comprises part of a boom lift comprising an adjustable arm mounted on a moveable vehicle, wherein the work platform is supported by the adjustable arm, the method comprising controlling the projector based on a mode of operation of the boom lift.

40. A method according to claim 39 comprising turning on the projector when the work platform is occupied or when the work platform is above a threshold height, and turning off the projector when the work platform is unoccupied or when the work platform is below the threshold height.

41. A method according to claim 39 wherein the boom lift comprises a control system having user interfaces at the work platform and the moveable vehicle, the method comprising turning on the projector when the user interface at the work platform is active and/or turning off the projector when the user interface at the moveable vehicle is active.

42. A method for warning of overhead hazards presented by an elevated work platform, the method comprising:
providing a projector coupled to the work platform;
operating the projector to project a pattern of light downwardly to produce a visual indication on a surface below the work platform; and
detecting an orientation of the projector and controlling the projector based on the detected orientation.

43. A method according to claim 42 wherein the method further comprises determining a height of the projector relative to the surface below the work platform and controlling the projector based on the determined height wherein controlling the projector comprises varying an angular spread of the pattern of light projected by the projector based on the height of the projector.

44. A method according to claim 43 comprising maintaining the size of the visual indication constant regardless of the height of the projector.

45. A method according to claim 43 comprising increasing the size of the visual indication as the height of the projector increases.

46. A method according to claim 42 wherein the work platform comprises part of a boom lift comprising an adjustable arm mounted on a moveable vehicle, wherein the work platform is supported by the adjustable arm, the method comprising controlling the projector based on a mode of operation of the boom lift.

47. A method according to claim 46 comprising turning on the projector when the work platform is occupied or when the work platform is above a threshold height, and turning off the projector when the work platform is unoccupied or when the work platform is below the threshold height.

48. A method according to claim 46 wherein the boom lift comprises a control system having user interfaces at the work platform and the moveable vehicle, the method comprising turning on the projector when the user interface at the work platform is active and/or turning off the projector when the user interface at the moveable vehicle is active.

49. A method for warning of overhead hazards presented by an elevated work platform, the method comprising:
providing a projector coupled to the work platform; and
operating the projector to project a pattern of light downwardly to produce a visual indication on a surface below the work platform, wherein the projector is mounted on a levelling mechanism configured to adjust the orientation of the projector, the method comprising detecting an orientation of the projector and controlling the levelling mechanism to maintain the orientation of the projector substantially constant.

* * * * *